United States Patent
Kim et al.

(10) Patent No.: US 7,963,478 B2
(45) Date of Patent: Jun. 21, 2011

(54) WING-FLAPPING FLYING APPARATUS AND METHOD OF USING THE SAME

(75) Inventors: Kwang Ho Kim, Seoul (KR); Jae Hak Jeon, Seoul (KR); Yoon Joo Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 592 days.

(21) Appl. No.: 11/997,029

(22) PCT Filed: Feb. 8, 2006

(86) PCT No.: PCT/KR2006/000454
§ 371 (c)(1),
(2), (4) Date: Jun. 27, 2008

(87) PCT Pub. No.: WO2007/013721
PCT Pub. Date: Feb. 1, 2007

(65) Prior Publication Data
US 2008/0251632 A1    Oct. 16, 2008

(30) Foreign Application Priority Data
Jul. 27, 2005  (KR) .......................... 10-2005-0068208

(51) Int. Cl.
*B64C 33/00* (2006.01)
(52) U.S. Cl. .................. 244/22; 244/11; 244/9; 244/72; 446/35
(58) Field of Classification Search ............ 244/11, 244/9, 22, 72; 446/35
See application file for complete search history.

(56) References Cited

U.S. PATENT DOCUMENTS

| | | | |
|---|---|---|---|
| 6,082,671 A | 7/2000 | Michelson | |
| 6,227,483 B1 | 5/2001 | Therriault | |
| 6,540,177 B2 | 4/2003 | Woo et al. | |
| 2004/0155145 A1* | 8/2004 | Ohta et al. | 244/72 |

FOREIGN PATENT DOCUMENTS

| | | |
|---|---|---|
| KR | 20-011742 | 1/1998 |
| KR | 20-0336766 | 12/2003 |
| KR | 10-0450535 | 10/2004 |

OTHER PUBLICATIONS

Korean Patent Publication, 10-0587446, dated May 30, 2006.

* cited by examiner

*Primary Examiner* — Joshua J Michener
*Assistant Examiner* — Justin Benedik
(74) *Attorney, Agent, or Firm* — Jones Day

(57) ABSTRACT

The present invention provides a wing-flapping flying apparatus, which can fly by moving its wings similar to a bird hovering or flying in the air by flapping its wings. The wing-flapping flying apparatus comprises: a body; a rotating shaft rotatably joined to the body; driving means for rotating the rotating shaft; and wings reciprocated between two points and connected to the rotating shaft so as to be rotated together with the rotating shaft and to be relatively torsionally rotated with respect to the rotating shaft. The wing-flapping flying apparatus generates lift throughout an entire wing-flapping movement without generating lift only throughout the half of a wing-flapping movement or offsetting the generated lift by the other half of the wing-flapping movement. Therefore, the wing-flapping flying apparatus can provide not only a stable flight but also a softly hovering or ascending and descending flight.

5 Claims, 8 Drawing Sheets

WING-FLAPPING FLYING APPARATUS AND METHOD OF USING THE SAME

TECHNICAL FIELD

The present invention generally relates to a flying apparatus, and more particularly to a wing-flapping flying apparatus that uses wing-flapping movements similar to a bird's flap of wings and generates lift throughout an entire wing-flapping movement to thereby provide a stable flight. Further, the present invention relates to a method of driving wings of the above wing-flapping flying apparatus and a blower comprising the same.

BACKGROUND ART

In recent years, wing-flapping flying apparatuses have been developed, which are capable of flying by mechanically performing upward-and-downward movements of the wings similar to a bird's flap of wings. Such wing-flapping flying apparatuses were configured to convert rotatary motion from a power source into reciprocating motion, thereby moving its wings upward and downward by means of appropriate mechanisms.

One example of prior art wing-flapping flying apparatuses is disclosed in Korean Utility-Model Registration Publication No. 20-0117142 (Hong). This publication discloses a bird-shaped flying toy, wherein twisted elastic strings are used as a power source and wing frames secured to lateral opposed sides of a hollow body are moved up and down. Also, Korean Utility-Model Registration Publication No. 20-0336766 (Chang) discloses a drive mechanism of a wing-flapping flying object, wherein the rotation of an electric motor is appropriately adjusted by means of a transmission and wings are caused to be moved up and down around hinges provided on a body portion by means of a crank mechanism. Also, Korean Patent Registration Publication No. 10-0450535 (Yoon, et al.) discloses a compressed air engine and a flying toy using the same, wherein wings are caused to be moved upward and downward by using a compressed air.

These prior art wing-flapping flying apparatuses employed a mechanism capable of converting rotatary motion generated from a power source using a human power or an electrical power into reciprocating motion or directly generating reciprocating motion so as to effectuate their flights by simply flapping the wings upward and downward. However, the simple upward-and-downward movements of the wings generate lift only when the wings are downwardly moved and offset the generated lift when the wings are upwardly moved. Thus, there is a problem in that the lift required for the flight of the flying object is not generated throughout an entire wing-flapping movement.

Further, there is another problem in that the size and weight of the flying object respectively become larger and heavier. This is because the wings need to be bigger in order to complement the lack of lift and the mechanism for converting the rotatary motion from the power source into the reciprocating motion need to be provided.

Moreover, since the simple upward-and-downward movements of the wings in the prior art wing-flapping flying apparatuses merely act to ensure that the flying apparatus does not fall down when staying in the air, there is yet another problem in that the upward, downward and forward flights cannot be easily effectuated.

DISCLOSURE

Technical Problem

Therefore, it is an object of the present invention to provide a wing-flapping flying apparatus that generates lift throughout an entire wing-flapping movement without generating lift only throughout the half of a wing-flapping movement or offsetting the generated lift due to the other half of a wing-flapping movement, thereby being capable of providing a stable flight.

It is a further object of the present invention to provide a wing-flapping flying apparatus that has a configuration capable of controlling a generation of lift, thereby being capable of providing a precise flight.

It is another object of the present invention to provide a method of driving wings in said wing-flapping flying apparatus.

It is yet another object of the present invention to provide a wing-flapping blower adopting principles of said wing-flapping flying apparatus.

Technical Solution

In order to achieve the above and other objects, the present invention provides a wing-flapping flying apparatus, comprising the following: a body; a rotating shaft rotatably joined to the body; driving means for rotating the rotating shaft and periodically reversing a rotational direction of the rotating shaft; a plurality of wing parts connected to the rotating shaft so as to be rotated together with the rotating shaft and to be relatively torsionally rotated with respect to the rotating shaft; means for restricting a relatively torsional rotation range of the wing part with respect to the rotating shaft; and means for relatively torsionally rotating the wing part during reversion of a rotational direction of the rotating shaft.

The wing-flapping flying apparatus further comprises: a first power-transmitting member connected to the rotating shaft and being configured to transmit a rotatary force in the opposite direction to the rotational direction of the rotating shaft; and a second power-transmitting member transmitting a rotatary force in the same direction as the rotational direction of the rotating shaft. One of the wing parts is connected to the first power-transmitting member so as to be relatively torsionally rotated with respect thereto. The other of the wing parts is connected to the second power-transmitting member so as to be relatively torsionally rotated with respect thereto.

The means for restricting the relatively torsional rotation range comprises: a stopper fixed with respect to the rotating shaft; and a first protrusion formed on the wing part so as to contact the stopper by a relatively torsional rotation of the wing part. It is preferable that the contact of the stopper and the first protrusion is effected at two points.

In such a case, it is preferable that an included angle between the two points and a center of the relatively torsional rotation of the wing part is in the range of 60° to 120°.

The means for relatively torsionally rotating the wing part comprises: a pin member fixed to the body so as to correspond to a reversion location of the rotational direction of the rotating shaft; and a second protrusion formed on the wing part so as to contact the pin member during reversion of the rotational direction of the rotating shaft.

In such a case, it is preferable that the pin member comprises a plurality of pins placed apart from each other at a predetermined angle around the rotating shaft and the wing part is reciprocated around the rotating shaft between two mutually adjacent pins.

According to a further aspect of the present invention, there is provided a wing-flapping flying apparatus, comprising the following: a body; a rotating shaft rotatably joined to the body; driving means for rotating the rotating shaft; motion-converting means having a linearly movable reciprocating member and converting a rotatary motion of the rotating shaft into a linearly reciprocating motion to thereby linearly reciprocate the reciprocating member; a pivoting shaft provided in the vicinity of the reciprocating member; a plurality of wing parts connected to the pivoting shaft so as to be relatively torsionally rotated with respect to the pivoting shaft; a wing-driving member connecting the reciprocating member and the wing part and rotating the wing part around the pivoting shaft by linearly reciprocating movements of the reciprocating member; means for restricting a relatively torsional rotation range of the wing part with respect to the pivoting shaft; and means for relatively torsionally rotating the wing part during reversion of a moving direction of the reciprocating member.

According to another aspect of the present invention, there is provided a wing-flapping flying apparatus, comprising the following: a body; a rotating shaft rotatably joined to the body; driving means for rotating the rotating shaft; motion-converting means having a linearly movable reciprocating member and converting a rotatary motion of the rotating shaft into a linearly reciprocating motion to thereby linearly reciprocate the reciprocating member; a first pivoting shaft and a second pivoting shaft provided in the vicinity of the reciprocating member such that a movement path of the reciprocating member can be positioned therebetween; a plurality of wing parts connected to the first and second pivoting shafts so as to be relatively torsionally rotated with respect to each pivoting shaft; a first wing-driving member connecting the reciprocating member and one of the wing parts and rotating one of the wing parts around the first pivoting shaft by linearly reciprocating movements of the reciprocating member and a second wing-driving member connecting the reciprocating member and the other of the wing parts and rotating the other of the wing parts around the second pivoting shaft by linearly reciprocating movements of the reciprocating member; means for restricting a relatively torsional rotation range of the wing part with respect to the pivoting shaft; and means for relatively torsionally rotating the wing part during reversion of a moving direction of the reciprocating member.

The motion-converting means further comprises: a circular plate provided at a distal end of the rotating shaft; a driving pin radially movable on the circular plate and extending in parallel with the rotating shaft; and a frame for guiding movements of the reciprocating member. The reciprocating member is formed with a groove for receiving the driving pin.

The means for restricting relatively torsional rotation range comprises: a stopper fixed with respect to the pivoting shaft; and a first protrusion formed on the wing part so as to contact the stopper by a relatively torsional rotation of the wing part. It is preferable that the contact of the stopper and the first protrusion is effectuated at two points.

In such a case, it is preferable that an included angle between the two points and a center of the relatively torsional rotation of the wing part is in the range of 60° to 120°.

The means for relatively torsionally rotating the wing part comprises: a pin member fixed to the body so as to correspond to a location of the wing part during reversion of the moving direction of the reciprocating member; and a second protrusion formed on the wing part so as to contact the pin member during reversion of the moving direction of the reciprocating member.

According to yet another aspect of the present invention, there is provided a method of driving wings in a wing-flapping flying apparatus, which includes: a body; a rotating shaft rotatably joined to the body; driving means for rotating the rotating shaft; and wings reciprocated between two points and connected to the rotating shaft so as to be rotated together with the rotating shaft and to be relatively torsionally rotated with respect to the rotating shaft. The method of driving the wings comprises: maintaining the wing inclined at a constant angle relative to a travel direction of the wing while the wing travels toward one of the two points; relatively torsionally rotating the wing in the opposite direction to the travel direction of the wing when the wing reaches one of the two points; and moving the wing toward the other of the two points.

The respective rotational directions of the wings around the rotating shaft can be different.

Further, it is preferable that the constant angle is in the range of 30° to 60°.

According to still yet another aspect of the present invention, there is provided a blower with wing-flapping movements, comprising: the above-described wing-flapping flying apparatus; and a fixing member to which the body of the wing-flapping flying apparatus is secured.

BEST MODE

A wing-flapping flying apparatus, a method of driving wings of a wing-flapping flying apparatus and a blower with wing-flapping movements according to the present invention will now be described in detail with reference to the accompanying drawings.

Figure 1:
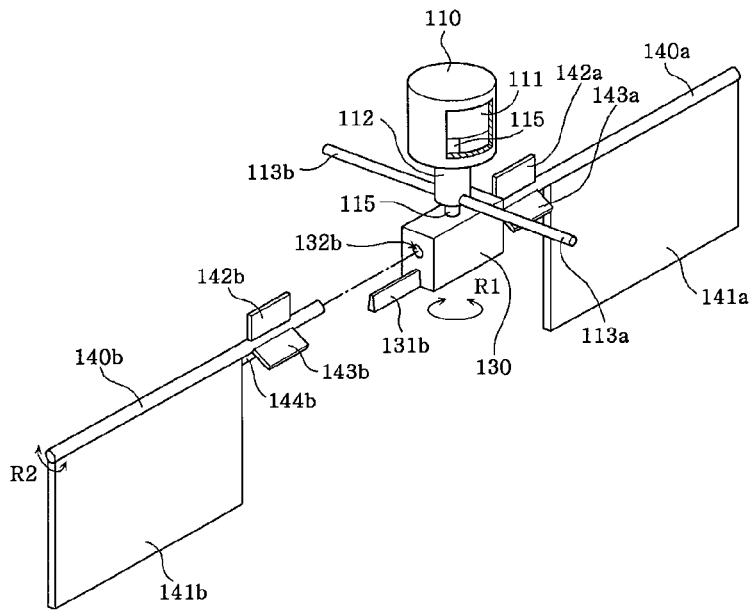
FIG. 1 is a perspective view illustrating a wing-flapping flying apparatus constructed in accordance with a first embodiment of the present invention.
Figure 2:
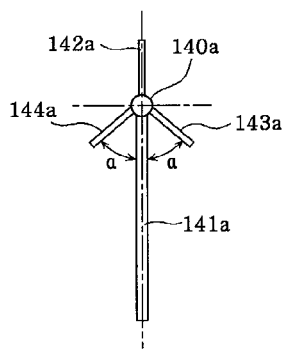
FIG. 2 is a front view of a wing shaft.
Figure 3:
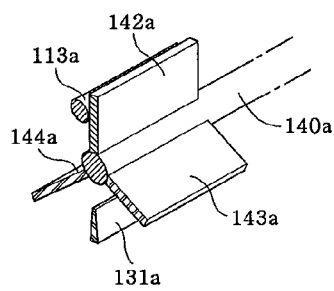
FIG. 3 is a partial perspective view illustrating components related to a relatively torsional rotation of the wing shaft.

FIG. 1 is a perspective view illustrating a wing-flapping flying apparatus constructed in accordance with a first embodiment of the present invention. FIG. 2 is a front view of a wing shaft. FIG. 3 is a partial perspective view illustrating components related to a relatively torsional rotation of the wing shaft.

Referring now to FIGS. 1 to 3, the wing-flapping flying apparatus 100 comprises the following: a body 110; a rotating shaft 115 rotatably joined to the body 110; driving means 111 for rotating the rotating shaft and periodically reversing a rotational direction thereof; a plurality of wing parts 140a and 141a, 140b and 141b connected to the rotating shaft 115 so as to be rotated together with the rotating shaft 115 and to be relatively torsionally rotated with respect to the rotating shaft 115; means 131a, 131b, 143a, 143b, 144a, 144b for restricting a relatively torsional rotation range of the wing part 140a and 141a, 140b and 141b with respect to the rotating shaft 115; and means 113a, 113b, 142a, 142b for relatively torsionally rotating the wing part 140a and 141a, 140b and 141b during reversion of a rotational direction of the rotating shaft 115.

The driving means 111 is a rotary machine provided in the body 110. If necessary, the rotary machine itself may play a role of the body. The rotary machine 111 in this embodiment serves not only to generate a power needed for the flight of the wing-flapping flying apparatus 100 by rotating the rotating shaft 115, but also to periodically reverse the rotational direction of the rotating shaft 115. For example, a DC motor may be employed as the rotary machine.

The wing part includes a wing shaft 140a, 140b connected to the rotating shaft 115 and a wing 141a, 141b coupled to the wing shaft 140a, 140b. The wing shaft 140a, 140b is connected to the rotating shaft 115 by a hub 130 coupled to an end of the rotating shaft 115.

The wing shafts 140a and 140b are symmetrically coupled to the hub 130. To this end, the opposed sides of the hub 130 are formed with holes 132b for insertion of the wing shaft (only one of the holes is shown in FIG. 1). The wing shafts 140a and 140b are coupled to the holes for insertion of the wing shaft formed in the hub 130 in such a manner that the wings 141a and 141b can be rotated clockwise and counter-clockwise within a predetermined angular range when viewing the wing-flapping flying apparatus 100 with a center of the wing shaft 140a, 140b located in front. Hereinafter, such rotation of the wings 141 and 141b will be referred to as "relative torsional rotation". Therefore, it should be noted that the wing shaft 140a and 140b should be coupled to the hub 130 so as to be rotated with respect to the hub 130 and not to be separated therefrom.

Further, the hub 130 is provided with stoppers 131a and 131b similar to a thin pin. The stoppers extend from the hub 130 in the direction of the extension of the wing shafts 140a and 140b. The stoppers cooperate with first protrusions 143a to 144b described below to thereby restrict the wings 141a and 141b provided in the wing shaft 140a and 140b from being further rotated over a predetermined angle around the wing shaft 140a and 140b.

As the wings 141a and 141b, which extend on the wing shaft 140a and 140b in one direction and have a specific area, are rotated, lift and propulsion needed for the flight of the wing-flapping flying apparatus are generated. Here, the wings 141a and 141b are rotated in two manners. One is a rotation to be formed in a manner of making a large circle around the rotating shaft 115 (indicated as R1 in FIG. 1) and the other is a relatively torsional rotation around the wing shaft 140a, 140b (indicated as R2 in FIG. 1).

More specifically, the rotation R1 is effectuated as the rotating shaft 115, the hub 130 and the wing shafts 140a and 140b are involved. Since the rotational direction of rotating shaft 115 is periodically reversed by the rotary machine, the rotational direction of such rotation R1 of the wings 141a and 141b is also reversed every half rotation. Also, the relatively torsional rotation R2 is effectuated as the hub 130 and the wing shaft 140a and 140b are involved. The relatively torsional rotation R2 is effectuated in such a manner that the wings 141a and 141b are naturally rotated in the opposite direction to the travel direction of the wing shaft 140a, 140b by the action of air impinging on the wing 141a, 141b during the rotation R1.

It is preferable that the above-described wings 141a and 141b are configured to generate aerodynamical lift. As shown in the figures, the wings may be configured in the form of a rectangular plate member. Any shape such as a fan shape, an oval shape and the like may be applied. Also, the wings 141a and 141b may be configured to be a single member as shown in the figures or may be configured in such a manner that a wing-shaped frame is provided and a membrane of film is attached to this frame to generate aerodynamic lift. In this embodiment, since the wings 141a and 141b provided on the wing shafts 140a and 140b are configured to be rotated by air impinging thereon around the wing shafts 140a and 140b, it will be understood that the wings 141a and 141b should be provided at the same side of the respective wing shafts 140a and 140b.

Further, each wing shaft 140a and 140b is provided with first protrusions 143a to 144b in a pair, which extend from the wing shaft 140a and 140b while being angled to the wings 141a and 141b in the right and left side of the wing shaft. The wing shaft 140a is provided with first protrusions 143a and 144a, and the wing shaft 140b is provided with first protrusions 143b and 144b.

These first protrusions 143a to 144b cooperate with the stoppers 131a and 131b provided on the hub 130. In the above-discussed relatively torsional rotation R2, the first protrusions 143a to 144b obstruct the further rotation of the wings 141a and 141b around the wing shafts 140a and 140b over a predetermined angle to thereby restrict the relatively torsional rotation range. In the wing shaft 140b, for instance, the wing shaft 140b is initially coupled to the hub 130 such that the stopper 131b is located between the first protrusions 143b and 144b. Accordingly, the rotational range of the wing 140b is limited within an angular range between the first protrusions 143b and 144b.

Further, each wing shaft 140a and 140b is provided with second protrusions 142a and 142b in the opposite direction to the extending direction of the wing. The second protrusion serves as a point of action, on which forces act in rotating the wing 141a, 141b around the wing shaft 140a, 140b. By the cooperation of the second protrusions 142a and 142b and pins 113a and 113b, as described below, the wings 141a and 141b can be relatively torsionally rotated around the wing shafts 140a and 140b quickly and precisely in the opposite direction to the moving direction of the wing shaft 140a and 140b during the reversion of the rotational direction of the rotating shaft 115.

A positional relationship among the above-described wing shafts, wings, first protrusions and second protrusions is shown in FIG. 2 in detail. Referring to FIG. 2, the wing 141a and the second protrusion 142a extend in the mutually opposite directions relative to the wing shaft 140a. Each first protrusion 143a and 144a extend in the side of the wing shaft 140a, from which the wing 141a extends, from the wing shaft 140a at a predetermined angle α with respect to the wing 141a. Therefore, it will be understood that the range of the angle related to the relatively torsional rotation of the wing 141a is limited within two times the angle α. In this embodiment, it is preferable that the range of the angle α is in the range of 30° to 60°. Accordingly, it is preferable that an included angle between the first protrusions 143a and 144a with respect to the wing shaft 140a is in the range of 60° to 120° (hereinafter, any angle within such range will be referred to as "an optimum wing angle"). According to the experiments conducted by the present inventors, it was found that when the wing 141a is rotated or turned around the wing shaft 140a by air impinging thereon while being rotated around the rotating shaft 115 (that is, the rotation R1), the lift generated by the wing 141a is considerably decreased in case it is rotated or turned at an angle less than 30° or more than 60°.

FIG. 3 shows the components related to the relatively torsional rotation (that is, the rotation R2) of the wing shaft 140a. When the wing shaft 140a is rotated around the rotating shaft 115 (that is, the rotation R1), the wing 141a undergoes a pressure caused by air impinging thereon. Since the wing shaft 140a is coupled to the hub 130 so as to be relatively torsionally rotated, the wing 141a is conformably rotated or turned in the opposite direction to the travel direction of the wing shaft 140a. The wing shaft 140a is also rotated in the same direction as the rotational direction of the wing 141a accordingly.

However, such relatively torsional rotation of the wing shaft 140a cannot be further performed by contacting the first protrusion 143a or 144a provided on the wing shaft 140a to the stopper 131a. In such a case, since the included angle between the first protrusion 143a or 144a and the wing 141a is in the range of 30° to 60°, the limits to which the wing 141a can be rotated in one direction around the wing shaft 140a are in the range of 30° to 60° or is restricted to a slightly less range than such a range. Thus, the wing 141a can generate a large aerodynamic lift as described above.

Referring back to FIG. 1, pins 113a and 113b extend from the body 110 symmetrically. The pins cooperate with the second protrusions 142a and 142b provided on the wing shaft 140a and 140b, thereby quickly and precisely rotating the wings 141a and 141b around the wing shaft 140a and 140b during reversion of the rotational direction of the rotating shaft 115. Thus, it will be understood that the pins 113a and 113b should extend so as to contact the second protrusions 142a and 142b. While the pins 113a and 113b are provided on an extended portion 112 formed in the body 110 in FIG. 1, the pins 113a and 113b are directly provided on the body 110.

Preferably, the pins 113a and 113b are positioned at angular positions when the rotational direction of the rotating shaft 115 is reversed. Thus, when the wing shafts 140a and 140b approach the places where their rotational directions are reversed during the rotation around the rotating shaft 115, the second protrusions 142a and 142b and the pins 113a and 113b collide with each other. At this time, the pins 113a and 113b fixed to the body 110 serve as a kind of a fulcrum and therefore the second protrusions 142a and 142b are rotated in the opposite direction to the travel direction of the wing shafts 140a and 140b by the rotatary force of the wing shafts 140a and 140b and the reaction of the pins 113a and 113b. As a result, the wings 141a and 141b, which extend in the opposite direction to the second protrusions 142a and 142b, are instantly rotated from the backward rotated state in the travel direction of the wing shafts 140a and 140b toward the forward. By doing so, the lift can be generated by the wings 141a and 141b.

Figure 4:
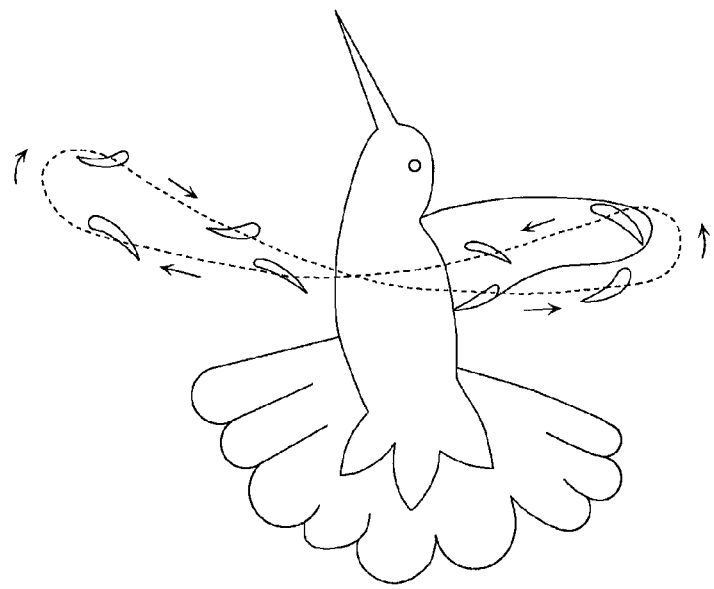
FIG. 4 is an illustration representing flight principles of the wing-flapping flying apparatus according to the present invention.

FIG. 4 is an illustration representing the flight principles of the wing-flapping flying apparatus according to the present invention. FIG. 4 shows movements of the hummingbird's wings when it hovers in the air, for example. Referring to FIG. 4, the hummingbird moves its wings to the left and then begins to move its wings reversely to the right at a point of time of reversing the movements of its wings to thereby obtain lift needed for a hovering flight. At this time, it performs a movement which makes the bottom faces of the wings face upward, that is, a movement which rotates the cross-section of the wing clockwise (hereinafter, such movement will be referred to as "a supination movement"). On the other hand, when it begins to move its wings to the left again at the point of time of reversing the movements of its wings after moving its wings to the right, it performs a movement which makes the bottom faces of the wings face downward, that is, a movement which rotates the cross-section of the wing counterclockwise (hereinafter, such movement will be referred to as "a pronation movement"). Through such movements, lift and propulsion are generated vertically to the right and left directions, which are the main moving direction of its wings. Further, its wings perform the supination and pronation movements around the hinges formed in its shoulder portion during the reversion of movements, thereby maximizing the lift and propulsion. Further, in reversion of movements of its wings, the faster the movements of the wings are within a shorter time, the more lift is obtained.

Comparing the above-described hummingbird's wing-flapping movements with the wing-flapping flying apparatus 100 according to the present invention, the process, wherein the hummingbird's wings are moved right and left, is similar to the rotations of the wing shafts 140a and 140b around the axis of the rotating shaft 115 (i.e., the rotation R1). Also, the process, wherein the hummingbird's wings perform the supination and pronation movements during the reversion of movements, is similar to the relative torsional rotation (i.e., the rotation R2) which the wings 141a and 141b make around the wing shaft 140a and 140b by the cooperation of the second protrusions 142a and 142b and the pins 113a and 113b.

Figure 5:
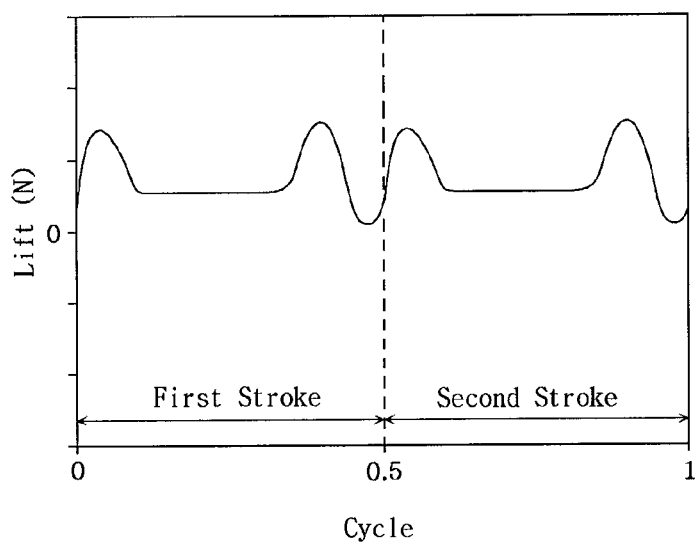
FIG. 5 is a graph showing lift variances during one cycle.

FIG. 5 is a graph showing lift variances during one cycle in the wing-flapping flying apparatus according to the present invention. The rotating shaft 115 in the wing-flapping flying apparatus completes one cycle in such a manner that it is rotated for an approximately half rotation in one direction and then reverses its rotational direction and returns to its initial location after being rotated for the other half rotation. In such a case, when the first half rotation is referred to as "a first stroke" and the latter half rotation is referred to as "a second stroke", lift variances during the strokes are shown in FIG. 5.

Referring to FIG. 5, it can be seen that lift is generated by the wings 141a and 141b in a middle range of each stroke, that is, when the wings 141a and 141b are rotated around the rotating shaft 115 (i.e., the rotation R1). This is because the wings, which are rotated by air impinging thereon in the rotation R1 of the wing shaft, pushes air downward successively while maintaining the declined state at the constant angle and passing through a certain range. Also, it can be seen that lift is rapidly increased between the strokes (i.e., when the wings 141a and 141b perform the above-described supination or pronation movement by the cooperation of the second protrusions 142a and 142b and the pins 113a and 113b). The state where lift falls below 0 between the first stroke and the second stroke indicates that the wings 141a and 141b are in alignment with the body 110 during the rotations and thus lift is not generated at that moment. Accordingly, it will be understood that shortening the time taken for the relatively torsional rotations of the wings 141a and 141b between the strokes guarantees a stronger lift generation, as can be seen in FIG. 5.

FIGS. 6 to 9 are side views of the wing shaft 140a sequentially showing that the relatively torsional rotation of the wing 114a takes place by the contact of the second protrusion 142a to the pin 113a.

Figure 6:
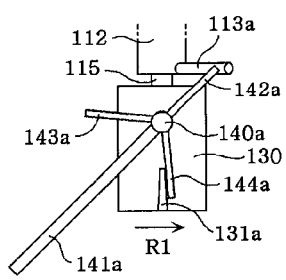
FIGS. 6 to 9 are side views sequentially showing a relatively torsional rotation of the wing shaft during reversion of a rotational direction of a rotating shaft.

FIG. 6 shows the state where the wing shaft 140a is rotated up to the reversion location of the rotational direction of the rotating shaft 115 and the second protrusion 142a is on the verge of a collision with the pin 113a. Before reaching said state, the wing 141a maintains a rotated posture (i.e., clockwise in FIG. 6) due to impinging air by the rotation of the wing shaft 140a around the rotating shaft 115 (i.e., the rotation R1). Further, since the first protrusion 144a is brought into contact with the stopper 131a, the wing 141a maintains the above-mentioned optimum wing angle.

Figure 7:
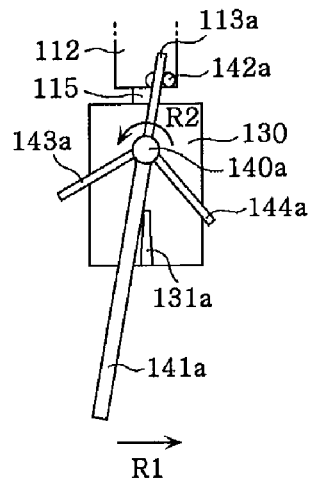

Referring to FIG. 7, the second protrusion 142a is rotated counterclockwise around the wing shaft 140a by the pin 113a fixed to the extended portion 112 of the body and the wing 141a is also rotated counterclockwise correspondingly. More specifically, while one directional rotation of the rotating shaft 115 is halted for the purpose of reversing the rotational direction of the rotating shaft 115, the wing shaft 140a keeps on moving toward the pin 113a with the second protrusion 142a contacted to the pin 113a. At this time, the second protrusion 142a fails to further advance due to the pin 113a, thereby being relatively rotated around the wing shaft 140a.

Figure 8:
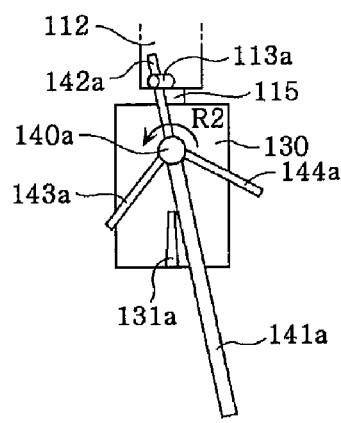

FIG. 8 shows a state where the rotation of the rotating shaft 115 is halted. The second protrusion 142a is left rotated in the opposite direction to the former travel direction of the wing shaft 140a and the wing 141a is left rotated in the same direction as the former travel direction of the wing shaft 140a accordingly.

Figure 9:
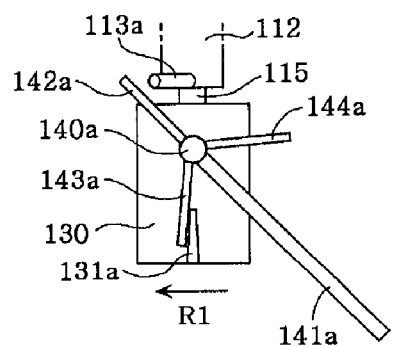

Referring to FIG. 9, the rotating shaft 115 now resumes the rotation in the opposite direction to the rotational direction in FIGS. 6 and 7. The wing 141a, which is left strongly rotated counterclockwise by the pin 113a, is restricted not only from being further rotated counterclockwise but also from being rotated backward by the impingement of air caused by the rotation of the rotating shaft 115 as the first protrusion 143a is brought into contact with the stopper 131a. Therefore, the wing 141a maintains the above-mentioned optimum wing angle.

The wing 141a, which is relatively torsionally rotatable with respect to the rotating shaft 115 around the wing shaft 140a, performs the above-described supination or pronation movement while undergoing the processes shown in FIGS. 6 to 9. It will be understood that the processes described with reference to FIGS. 6 to 9 take place likewise in the pin 113b side, since the pins 113a and 113b are symmetrically provided in the opposite sides of the body 110 and the entire components of the wing-flapping flying apparatus 100 are symmetrically constituted relative to the axis of the rotating shaft 115 and the rotating shaft 115 is configured to reverse its rotational direction in the vicinity of the pins 113a and 113b.

As such, the effects, wherein the lift does not disappear and is rather increased as described with reference to FIGS. 4 and 5, can be obtained at the point of time when one directional rotation of the rotating shaft 115 is halted and then the opposite directional rotation thereof is resumed. This is because the wing 141a is relatively torsionally rotated around the wing shaft 140a with respect to the rotating shaft 115 during the reversion of the rotational direction of the rotating shaft 115.

Referring back to FIG. 8, it is shown that the reversion of the rotational direction of the rotating shaft 115 is made when the wing shaft 140a slightly goes past the pin 113a. However, it is not necessary that the reversion of the rotational direction of the rotating shaft 115 is made in the state shown in FIG. 8. That is, the reversion of the rotational direction of the rotating shaft 115 can be made just before the wing shaft 140a goes past the pin 113 during the rotation of the rotating shaft 115 or just after that. In the former case, if the second protrusion 142a is slightly rotated in the opposite direction to the travel direction of the wing shaft 140a by the contact to the pin 113a, the rotating shaft 115 can resume the opposite directional rotation. In this case, if the rotating shaft 115 resumes the opposite directional rotation, the wing 141a is more and more rotated by the impinging air to thereby be rotated up to the optimum wing angle. Further, in the latter case, since the second protrusion 142a is more certainly rotated in the opposite direction to the travel direction of the wing shaft 140a, the rotating shaft 115 can resume the opposite directional rotation at that time.

Accordingly, it is preferable that the reversion of the rotational direction of the rotating shaft 115 is made during the rotation of the wing shaft 140a around the rotating shaft 115 between a point of time when the second protrusion 142a is brought into contact with the pin 113a and a point of time when the second protrusion 142a is separated from the pin 113a.

Further, the rotary machine 110, which can be accommodated inside the body 110, rotates the rotating shaft 115 to thereby generate lift and propulsion needed for the flight of the wing-flapping flying apparatus 100. If the rotational speed of the rotating shaft 115 is increased by the rotary machine 111, then the time required for one cycle, for which the wings 141a and 141b travel, is shortened. Then, the wings 141a and 141b push more volume of air downward and lift is increased thereby. In other words, since the increase and decrease of the rotational speed of the rotating shaft 115 by the rotary machine 111 lead to the increase and decrease of lift, the wing-flapping flying apparatus can carry out ascent and descent according to the increase and decrease of the rotational speed of the rotating shaft 115. In addition, in case of controlling the increase and decrease of the rotational speed of the rotating shaft 115 electrically or mechanically, the ascent and descent of the wing-flapping flying apparatus 100 can be controlled accordingly.

In addition, the rotary machine 111 is configured to periodically reverse the rotational direction of the rotating shaft 115. A DC motor can be used as a rotary machine suitable for such purpose. In case of using the DC motor as the rotary machine, the DC motor can periodically carry out normal and reverse rotations or one directional and the opposite directional rotations by applying a voltage with periodically reversed phase to the DC motor.

Further, since the rotary machine 111 reverses its rotational direction every half rotation of the rotating shaft 115, torques applied to the wings 141a and 141b may be insufficient. In order to increase the torques applied to the wings 141a and 141b, reducing the rotation more than a half rotation of the rotating shaft 115 (i.e., one rotation, two rotations or more) to the half rotation can increase the torques applied to the wings 141a and 141b. To this end, the rotary machine may be provided with means for reducing a plurality of rotations to a half rotation and the rotating shaft 115 may be connected to the output part of the reducing means. For example, in case the reducing means, which includes two gears or a gear train having plural gears, reduces plural rotations of the rotary machine to a half rotation of the rotating shaft, the half rotation of the rotating shaft 115 is accomplished from the plural rotations of the rotary machine, thereby increasing the torques applied to the wings 141a and 142b.

Figure 10:
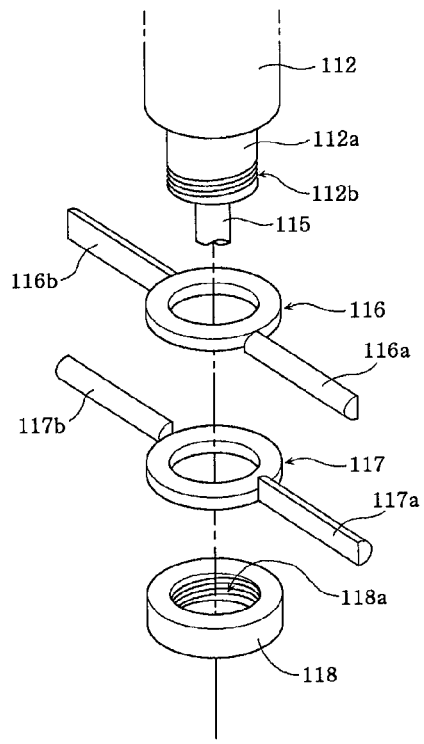
FIG. 10 is an exploded perspective view illustrating an alternative of a pin member.

FIG. 10 is an exploded perspective view illustrating an alternative of a pin member. Referring to FIG. 10, the pin member, which allows the relatively torsional rotation of the wings 141a and 141b by the contact to the second protrusions 142a and 142b, includes a first pin 116 and a second pin 117 that can be coupled to the body 110 or the extended portion 112 of the body in pairs and coaxially. These pins 116 and 117 can be coupled to the body 110 in such a manner that they are fitted to a protruded portion 112a, which is formed on the extended portion 112 of the body and has a thread at a distal end, and a nut 119 is then fastened thereto.

The first and second pins 116 and 117 can be widened with respect to each other at a predetermined angle around the rotating shaft 115. When the first and second pins 116 and 117 are slightly widened, the second protrusions 142a and 142b collide with the pin at a faster point of time when compared to the case that pins 113a and 113b are provided. Accordingly, in case two pins 116 and 117 can be widened at some extent in the above-described manner, the point of time when relatively torsional rotations of the wings 141a and 141b take place and the length of the strokes can be relatively adjusted and the magnitude of lift can be minutely adjusted thereby. Also, in case of electrically or mechanically controlling the minutely widened extent of the pins 116 and 117, it will be understood that a minute and precise flight control of the wing-flapping flying apparatus 100 can be effectuated.

While the wing-flapping flying apparatus 100 in accordance with this embodiment comprises two wing parts arranged symmetrically with respect to each other, three, four or more wing parts may be provided. In such a case, the pins participating in the relatively torsional rotation will also be provided in the same numbers as the wing parts and at the same interval around the rotating shaft and the reversion of the rotational direction of the rotating shaft 115 will be made according to the numbers of the wing parts (i.e., at the interval of 120° or 90°).

Figure 11:
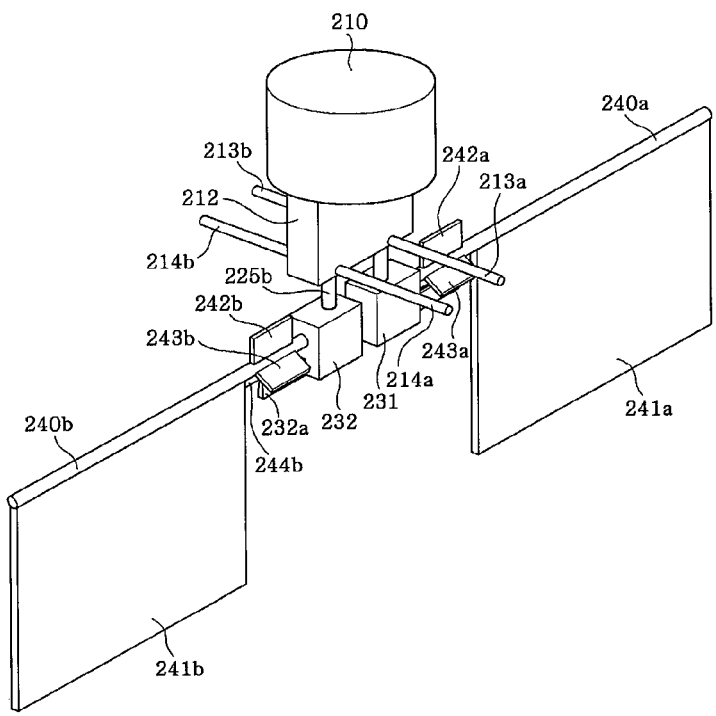
FIG. 11 is a perspective view illustrating a wing-flapping flying apparatus constructed in accordance with a second embodiment of the present invention.
Figure 12:
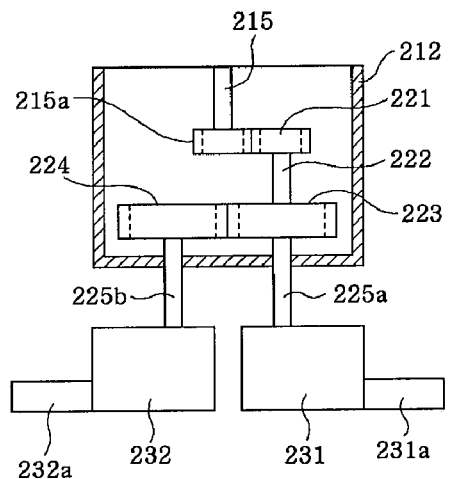
FIG. 12 is a sectional view showing an internal configuration of a portion of the wing-flapping flying apparatus shown in FIG. 11.

FIG. 11 is a perspective view illustrating a wing-flapping flying apparatus 200 in accordance with a second embodiment of the present invention. FIG. 12 is a sectional view showing an internal configuration of a portion thereof. The wing-flapping flying apparatus 200 in accordance with this embodiment is configured to rotate wing shafts 240a and 240b in mutually opposite directions around a rotating shaft 215 unlike the wing-flapping flying apparatus 100 of the first embodiment. The wing-flapping flying apparatus 200 in accordance with this embodiment has the same configuration as the wing-flapping flying apparatus 100 except that components for simultaneously rotating the wing shafts 240a and 240b in mutually opposite directions are employed and pins 213a to 214b are configured accordingly. Thus, the differences between the first and second embodiments will be described herein.

Referring to FIG. 12, the wing-flapping flying apparatus 200 comprises: a first power-transmitting member connected to the rotating shaft 215 and transmitting a rotatary force in an opposite direction to the rotational direction of the rotating shaft 215; and a second power-transmitting member transmitting a rotatary force in the same direction as the rotational direction of the rotating shaft 215. The first power-transmitting member has a driven element 221, a connecting shaft 222, a driving element 223 and a pivoting shaft 225a. The second power-transmitting member has a driven element 224 and a pivoting shaft 225b.

The driving element 215a is coupled to an end of the rotating shaft 215 extended from the rotary machine (not shown). The driven element 221 is connected to the driving element 215a and is coupled to the connecting shaft 222. An end of the connecting shaft 222 is coupled to the driving element 223. The driven element 224 is connected to the driving element 223. A first hub 231 is fixed to the driving element 223 via the pivoting shaft 225b and a second hub 232 is fixed to the driven element 224 via the pivoting shaft 225b. Wing parts 240a and 241a are connected to the pivoting shaft 225a so as to be relatively torsionally rotated via the hub 231 and wing parts 240b and 241b are connected to the pivoting shaft 225b so as to be relatively torsionally rotated via the hub 232.

The one directional rotation of the rotating shaft 215 is transmitted to the first hub 231 by the driving element 215a, the driven element 221, the connecting shaft 222, the driving element 223 and the pivoting shaft 225a. The first hub 231 is not in a coaxial relation with the rotating shaft 215 and is thus rotated in the opposite direction to the rotational direction of the rotating shaft 215. Further, the second hub 232 is rotated by the driving element 223, the driven element 224 and the pivoting shaft 225b in the opposite direction to the rotational direction of the first hub 231, that is, in the same rotational direction as that of the rotating shaft 215. Therefore, when the rotating shaft 215 is rotated, the first hub 231 is rotated in the opposite direction to the rotational direction of the rotating shaft 215 and the second hub 232 is rotated in the same direction as the rotational direction of the rotating shaft 215. Accordingly, the wing shafts 240a and 240b, which are joined to the first and second hubs 231 and 232, respectively, can be rotated in mutually opposite directions around the rotating shaft 215.

The rotational direction of the rotating shaft 215 in this embodiment, similar to the rotating shaft 115 in the first embodiment, is reversed by the rotary machine (not shown) capable of periodically reversing its rotational direction. Specifically, during the operation of the clockwise half rotation of the rotating shaft 215, the wing shaft 240a, which is connected to the pivoting shaft 225a via the first hub 231 so as to relatively torsionally rotated, carries out a counterclockwise half rotation and the wing shaft 240b, which is connected to the pivoting shaft 225b via the second hub 232 so as to relatively torsionally rotated, carries out a clockwise half rotation. Also, when the rotation of the rotating shaft 215 is reversed, the rotational directions of the wing shafts 240a and 240b are reversed as described above. Therefore, the wing-flapping flying apparatus 200 in this embodiment can perform such movements similar to a bird moving its wings forward and backward.

In order to rotate the wing shafts 240a and 240b within equal speed and range, it will be understood that the driving element 23 and the driven element 224 should have the same diameter. Further, it will be understood that a plurality of rotations of the rotary machine may be converted into a half rotation of the wing shaft 240a, 240b by differentiating the diameters of the driving element 215a and the driven element 221. The above-described driving elements 215a and 23 and driven elements 221 and 224 may include gears or may be configured in a belt driving manner.

The wing-flapping flying apparatus 200 in accordance with this embodiment is configured such that the wing shafts 240a and 240b are rotated in mutually opposite directions and second protrusions 242a and 242b do not impact and interfere with each other during the reversion of rotational direction. Also, a pin member consists of two pins 213a and 213b, 214a and 214b symmetrically extending from the body and placed apart with respect to each other accordingly.

The configurations and functions of the wing shafts 240a and 240b, which are connected to the pivoting shafts 225a and 225b so as to be relatively torsionally rotated, wings 241a and 242a provided on the wing shafts, first protrusions 243a, 244a, 243b and 244b (244a is not shown in the drawings), the second protrusions 242a and 242b and stoppers 231a and 232a extending from the hubs 231 and 232 are the same as the case of the first embodiment. Thus, their descriptions are omitted herein.

Figure 13:
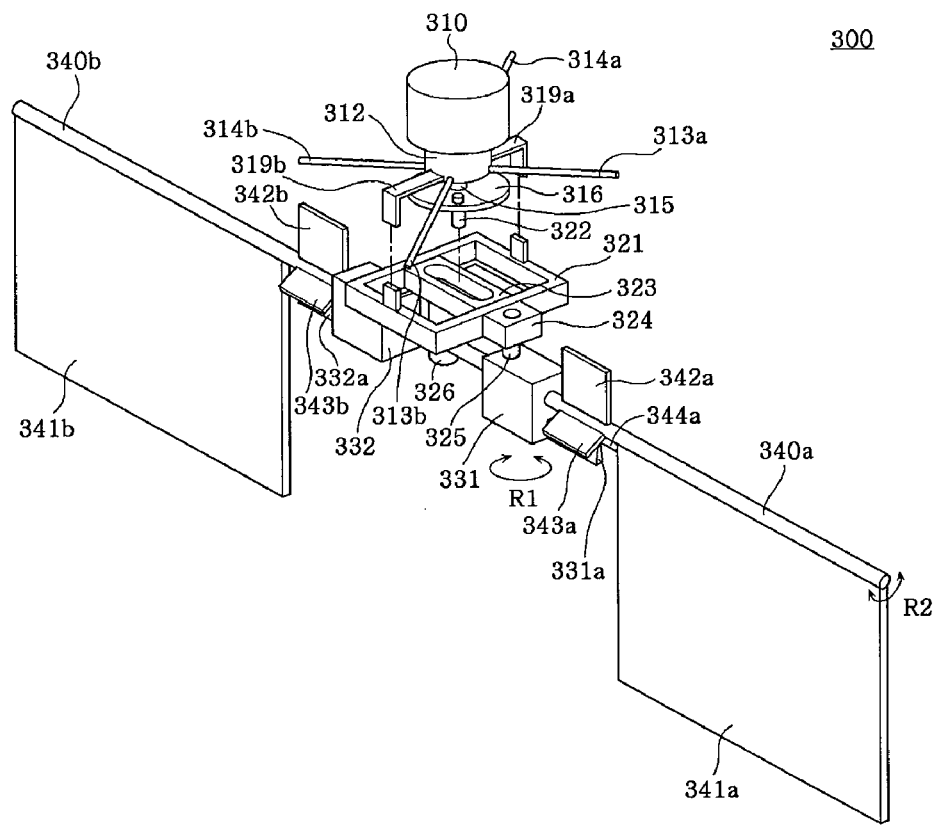
FIG. 13 is a perspective view illustrating a wing-flapping flying apparatus constructed in accordance with a third embodiment of the present invention.
Figure 14:
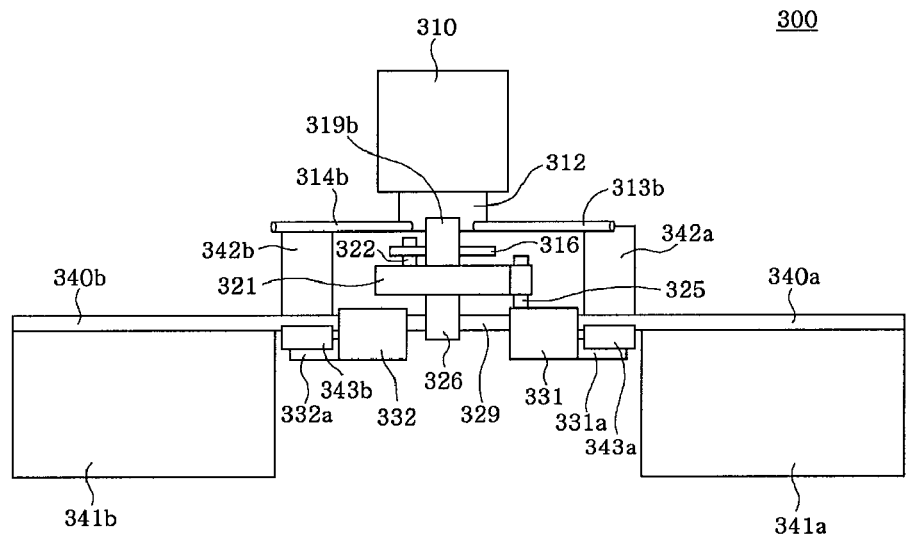
FIG. 14 is an elevational view of the wing-flapping flying apparatus of FIG. 13.

FIG. 13 is an exploded perspective view illustrating a wing-flapping flying apparatus constructed in accordance with a third embodiment of the present invention. FIG. 14 is an elevational view of the wing-flapping flying apparatus of FIG. 13.

The wing-flapping flying apparatus 300 in accordance with this embodiment employs driving means (not shown) capable of successively rotating a rotating shaft in one direction and further comprises motion-converting means converting the rotary motion of the rotating shaft by said driving means into a linearly reciprocating motion for reciprocating wing shafts, when compared to the first and second embodiments. Accordingly, the driving means in the wing-flapping flying apparatus in accordance with this embodiment includes a typical rotary machine such as an electric motor, a combustion engine consuming fuel and any rotary machine unlike the rotary machine capable of periodically reversing its rotational direction of the rotating shaft in the first and second embodiments.

More specifically, the wing-flapping flying apparatus 300 comprises the following: a body 310; a rotating shaft 315 rotatably joined to the body 310; driving means (not shown) for rotating the rotating shaft 315; motion-converting means having a linearly movable reciprocating member 323 and converting a rotary motion of the rotating shaft 315 into a linearly reciprocating motion to thereby linearly reciprocate the reciprocating member 323; a pivoting shaft 325 provided in the vicinity of the reciprocating member 323; a plurality of wing parts 340a and 341a, 340b and 341b connected to the pivoting shaft 325 so as to be relatively torsionally rotated with respect to the pivoting shaft 325; a wing-driving member 326 connecting the reciprocating member 323 and the wing parts 340a and 341a, 340b and 341b and rotating the wing parts 340a and 341a, 340b and 341b around the pivoting shaft 325 by linearly reciprocating the movements of the reciprocating member 323; means 331a, 332a, 343a, 343b, 344a, 344b (344b is not shown in the figures) for restricting a relatively torsional rotation range of the wing parts 340a and 341a, 340b and 341b with respect to the pivoting shaft 325; and means 313a, 313b, 314a, 314b, 342a, 342b for relatively torsionally rotating the wing parts 340a and 341a, 340b and 341b during reversion of a moving direction of the reciprocating member 323.

The rotary machine, which the wing-flapping flying apparatus 300 in this embodiment comprises, successively rotates the rotating shaft 15 in one direction to thereby generate power output. Since a wing-flapping movement requires forward and backward or right and left reciprocating movements of wings, there is a need to convert a rotary motion of the rotary machine into a reciprocating motion for the wing-flapping movement. To this end, the wing-flapping flying apparatus 300 comprises the motion-converting means for converting the rotary motion of the rotating shaft into the reciprocating motion.

Figure 15:
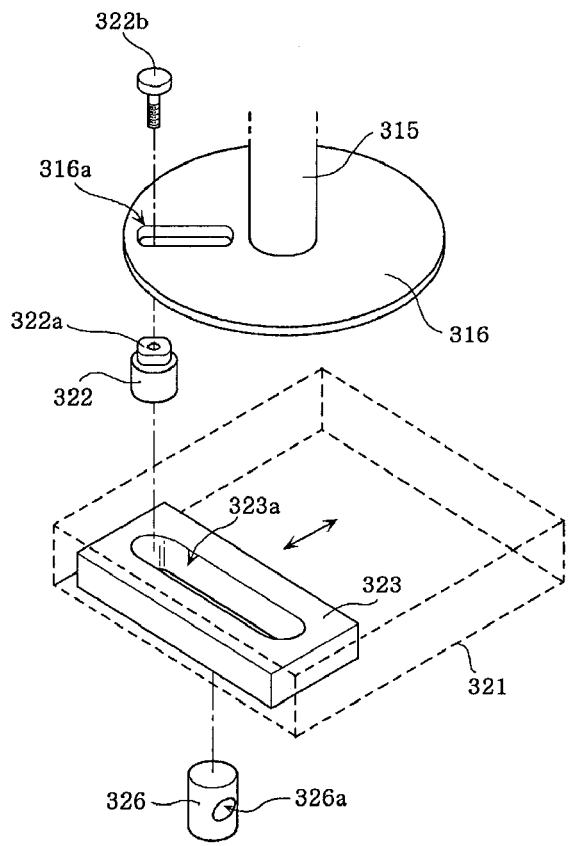
FIG. 15 is an exploded perspective view showing motion-converting means of the wing-flapping flying apparatus of FIG. 13.

FIG. 15 is an exploded perspective view schematically showing components needed for motion-conversion of the wing-flapping flying apparatus 300. Referring to FIG. 15, a circular plate 316 for enlarging the rotation of the rotating shaft is coupled to an end of the rotating shaft 315. The circular plate 316 is formed with a radial slit 316a. A driving pin 322 has a coupling portion at one end, which is formed slightly long so as to be suitable for the shape of the slit. The driving pin 322 is fitted into the slit 316a and then joined to the circular plate 316 by a fastening means such as a bolt or a screw 322b. A bar-shaped member can be employed instead of the circular plate for enlarging the rotation of the rotating shaft 315.

Under the driving ping 322, the reciprocating member 323 (i.e., slider) having a groove 323a, which the driving pin can be inserted into, is disposed. The slider 323 is accommodated in the movement-guiding part 321 such as a frame and is reciprocated within the frame 321 in a direction of a double-headed arrow shown in FIG. 15. Under the slider 323, the wing-driving member 326 (i.e., sleeve) rotatably joined to the slider 323 is disposed. A connecting shaft 329 to be described later is disposed while passing through a bore 326a formed through the sleeve 326.

Further, as shown in FIG. 13, since the frame 321 is fixed to the body 310 with connecting members 319a and 319b, the slider 323 accommodated in the frame 321 is allowed to be moved merely right and left or forward and backward. Here, the frame 321 serves to retain the accommodated slider 323 and guide reciprocating movements of the slider 323. Any rail-shaped member, which slidably supports the slider, can be added inside the frame 321 such that the reciprocating movements of the slider 323 are more smoothly performed.

The rotation of the rotating shaft 315 is enlarged to a great extent by the circular plate 316 and the driving pin 322. The driving pin 322 is inserted into the groove 323a of the slider and the slider 323 can be only linearly moved due to the frame 321. Thus, as the driving pin 322 is rotated while making an imaginary circle, the slider 323 is moved in the diametrical direction of the imaginary circle formed by the rotation of the driving pin 322. Since the driving pin 322 is inserted into the groove 323a of the slider, the driving pin 322 can be moved only along the groove 323a of the slider. Also, the slider 323 can only be linearly reciprocated due to restraint of the frame 321. Therefore, the rotation of driving pin 322 causes the driving pin 322 to push a side wall of the groove 323a. Accordingly, if the driving pin 322 is displaced from any one place to other place on the circumference of the imaginary circle which the driving pin 322 makes, then a diametrical distance corresponding to the displacement in the circumference becomes a reciprocating travel distance of the slider 322. Thus, it will be understood that the reciprocating travel distance of the slider 323 is limited to the diameter of the imaginary circle which the driving pin 322 makes during its rotation. In the above-discussed manner, the rotatary motion of the driving pin 322 is converted into the linear reciprocating motion of the slider 323.

Figure 16:
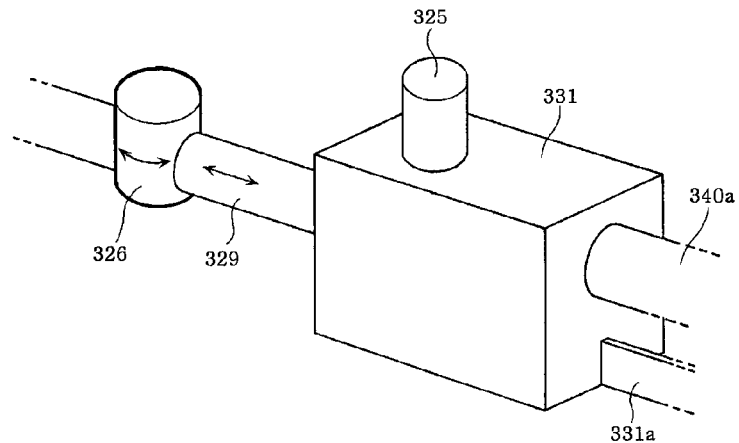
FIG. 16 is a partial perspective view showing the rotation of the wing shaft of the wing-flapping flying apparatus of FIG. 13.

FIG. 16 is a partial perspective view illustrating the rotation of the wing shaft of the wing-flapping flying apparatus 300. Referring to FIG. 16, the connecting shaft 329 coupled to the first hub 331 extends past through the bore 326a of the sleeve 326 rotatably mounted to the slider 323. Therefore, the connecting shaft 329 can be slidable in right and left directions in FIG. 16 while passing through the sleeve 326. Since the first hub 331 is fixed to the pivoting shaft 325 provided at a portion 324 of the frame, the first hub 331 is allowed to be rotated within some range around the pivoting shaft 325. Such rotation effectuates the rotation R1 of the wings 341a and 341b around the body 310, as described above in relation to the first embodiment.

Since the sleeve 326 is mounted to the slider 323, the sleeve 326 undergoes linear reciprocating movements within a determined range together with the slider 323. As the sleeve 326 is reciprocated, the connecting shaft 329 passing through the sleeve 326 causes the wing shaft 340a to be rotated around the pivoting shaft 325 like a kind of leverage action using the pivoting shaft 325 as a fulcrum. At this time, since the connecting shaft 329 is slidable through the sleeve 326, a distance between the sleeve 326 and the pivoting shaft 325 can be unobstructedly increased or decreased during the reciprocating movements of the sleeve 326.

Referring back to FIG. 14, the second hub 332 is coupled to the other end of the connecting shaft 329. Therefore, the wing shaft 340b connected to the second hub 322 is rotated in the same direction as the rotation of the wing shaft 340a caused by the sleeve 326.

In the meantime, as described with reference to FIG. 15, the reciprocating travel range of the slider 323 is limited to the diameter of the imaginary circle which the driving pin 322 makes during its rotation. Accordingly, as the diameter of the imaginary circle for the driving pin 322 becomes smaller, the reciprocating travel range can be smaller as well. Also, as the reciprocating travel range of the slider 323 becomes smaller, the range of the rotation R1 of the wing shafts 340a and 340b becomes smaller and thus the size of the stroke can be adjusted.

In the case of the constant number of revolution of the rotary machine, increase or decrease of the stroke range of the wing shafts 340a and 340b causes the rotational speed of the wing shaft 340a and 340b around the pivoting shaft 325 to be increased or decreased, which thus leads to increase or decrease of lift. In other words, in the case of the constant number of revolution of the rotary machine, the increase of the distance between the driving pin 322 and the rotating shaft 315 leads to the increase of the reciprocating travel range of the slider 323 and the increase of the stroke ranges of the wing shafts 340a and 340b as well. Consequently, the wing shafts 340a and 340b are moved throughout further distance per a given time and the rotational speed of the wing shafts 340a and 340b is increased, thereby increasing lift. On the other hand, the decrease of the distance between the driving pin 322 and the rotating shaft 315 leads to the opposite results to the above-discussed processes.

Therefore, increase and decrease of lift and propulsion in the wing-flapping flying apparatus 300 can be effectuated in two manners. One manner is that lift and propulsion are increased or decreased according to the increase or decrease of the number of revolution of the rotary machine in the case of the constant distance between the driving pin 322 and the rotating shaft 315. The other manner is that lift and propulsion are increased or decreased according to the increase or decrease of distance between the driving pin 322 and the rotating shaft 315 in the case of the constant number of revolution of the rotary machine.

As shown in FIG. 15, since the driving pin 322 is removably coupled to the circular plate 316, if necessary, the position of the driving pin 322 in the slit 316a can be adjusted manually. Further, in case the position of the driving pin 322 in the slit 316a is adjusted automatically by the use of electrical or mechanical means, the effective flight control of the wing-flapping flying apparatus 300 is possible since its lift and propulsion can be controlled without varying the number of revolution of the rotary machine.

Since the linear reciprocating movements of the slider 323 allow the wing shafts 340a and 340b to be rotated around the pivoting shaft 325 (i.e., the rotation R1), the positional relationship of the linearly reciprocating components and the pivoting shaft 325 makes the strokes of the wing shaft 340a and 340b less than 180°. Therefore, a pin member, which relatively torsionally rotates the wings 341a and 341b by being brought into contact with the second protrusions 342a and 342b, is provided on the body 310 so as to correspond to the stroke range of the wing shafts 340a and 340b. The pin member consists of a pair of first pin 313a, 313b and second pin 314a, 314b, which are symmetrically positioned on the body 310 at a predetermined angle therebetween so as to correspond to the locations at which rotational direction of the wing shafts 340a and 340b is reversed.

The configurations and functions of the wing shafts 340a and 340b, which are coupled to the first and second hubs 331 and 332 so as to be relatively torsionally rotated respectively, the wings 341a and 342a provided on the wing shafts, the first protrusions 343a, 343b, 344a, 344b (344b is not indicated in the drawings), the second protrusions 342a, 342b and the stoppers 331a, 332a extending from the hubs 331, 332 are the same as the case of the first embodiment. Thus, their descriptions are omitted herein.

In the wing-flapping flying apparatus 300 in accordance with this embodiment, since the pivoting shaft 325 is provided in one side of the frame 321, distances between the pivoting shaft 325 and the centers of the wings 341a and 341b may not be equal. Accordingly, it is preferable that distances between the pivoting shaft 325 and the centers of the wings 341a and 341b are of the same length in the case of the wing-flapping flying apparatus 300 in accordance with this embodiment.

Figure 17:
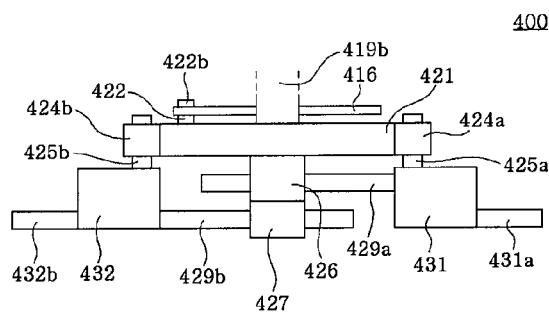
FIG. 17 is a partial elevational view of a wing-flapping flying apparatus constructed in accordance with a fourth embodiment of the present invention.
Figure 18:
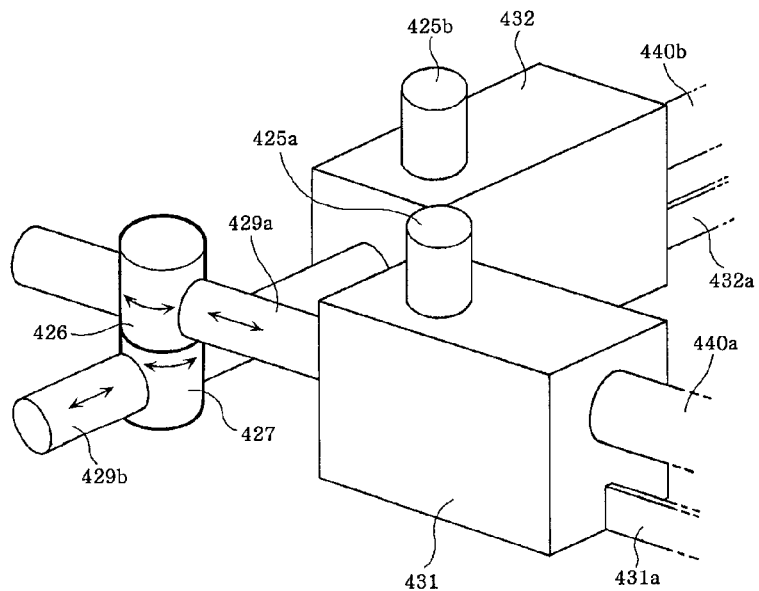
FIG. 18 is a partial perspective view showing the rotation of the wing shaft of the wing-flapping flying apparatus of FIG. 17.

FIG. 17 is a partial elevational view of a wing-flapping flying apparatus 400 constructed in accordance with a fourth embodiment of the present invention. FIG. 18 is a partial perspective view illustrating the rotation of the wing shafts 440a and 440b around the pivoting shafts 425a and 425b in the wing-flapping flying apparatus 400.

The wing-flapping flying apparatus 400 in accordance with this embodiment further comprises an additional element for rotating the wing shafts 440a and 440b in mutually opposite directions around the pivoting shafts, when compared to the wing-flapping flying apparatus 300 constructed in accordance with the third embodiment.

The wing shafts 340a and 340b are coupled to the first and second hubs 431 and 432 so as to be relatively torsionally rotated, respectively. A first pivoting shaft 425a and a second pivoting shaft 425b, to which the first and second hubs 431 and 432 are fixed respectively, are provided at opposed sides of a movement-guiding part 421 such as a frame, respectively. The first and second hubs 431 and 432 have a first extended shaft 429a and a second extended shaft 429b, which extend in the opposite direction to the extending directions of the wing shafts 440a and 440b, respectively.

Further, a wing-driving member consists of a first sleeve 426, through which the first extended shaft 429a slidably passes, and a second sleeve 427, through which the second extended shaft 429b slidably passes. Theses sleeves 426 and 427 are aligned so as to be rotated around a common axis. The first sleeve 426 is rotatably mounted to a reciprocating member (not shown) such as a slider and the second sleeve 427 is rotatably mounted to the first sleeve 426.

Since the sleeves 426 and 427 are integrally coupled to the slider, the sleeves 426 and 427 undergo linear reciprocating movements within a determined range together with the slider. As the first sleeve 426 is reciprocated, the extended shaft 429a passing through the first sleeve 426 causes the wing shaft 440a to be rotated around the first pivoting shaft 425a like a kind of leverage action using the first pivoting shaft 425a as a fulcrum. At the same time, the second extended shaft 429b passing through the second sleeve 427 causes the opposite wing shaft to be rotated around the second pivoting shaft 425b. At this time, since the first and second extended shafts 429a and 429b are slidable through the sleeves 426 and 427, respectively, the distances between the sleeves 426 and 427 and the pivoting shafts 425a and 425b can be unobstructedly increased or decreased during the reciprocating movements of the sleeves 426 and 427.

As can be seen from FIG. 18, the rotations of wing shafts 440a and 440b around the respective pivoting shafts 425a and 425b caused by the reciprocating movements of the sleeves 426 and 427 are in mutually opposite directions. Therefore, the wing-flapping flying apparatus 400 in accordance with this embodiment can perform such movements similar to a bird moving its wings forward and backward.

In the wing-flapping flying apparatus 400 in accordance with this embodiment, the components involved with the relatively torsional rotations of the wings and the components for maintaining the wings at the optimum angle can be employed in the same manner as the corresponding components of the wing-flapping flying apparatus 300 constructed in accordance with the third embodiment. Thus, their descriptions are omitted herein.

As an alternative to the wing shaft rotating of the wing-flapping flying apparatus 400 in accordance with this embodiment, the first and second sleeves 426 and 427 can be rotatably mounted to the opposed bottom sides of the slider and a common pivoting shaft can be mounted to the bottom portion of the movement-guiding part so as to be positioned where the first and second extended shafts 429a and 429b are crossed. If so, then the wing shafts 440a and 440b are allowed to be rotated in the mutually opposite directions.

Further, conversion of the one-way rotary motion of the rotating shaft into the reciprocating motion of the wing shafts without use of a reciprocating member like the above-described slider can be taken into consideration as an alternative to the motion-converting of the wing-flapping flying apparatus employing a one-way rotary machine. For example, in case a pivoting shaft is mounted to the circular plate instead of the driving pin and connecting shafts, which connect to hubs respectively, are coupled to the said pivoting shaft so as to be rotated around the said pivoting shaft and sleeves, through which the said connecting shafts slidably pass respectively, are rotatably provided on the body, the wing shafts can be rotated with the rotation of the rotating shaft like sculling of a boat.

In the above-described wing-flapping flying apparatus, it has been described that two first protrusions are provided on the wing shaft and one stopper is provided on the hub along the extending direction of the wing shaft. However, the present invention is not limited thereto and can be embodied in the different manners therefrom. That is, one first protrusion can be provided on the wing shaft along the extending direction of the wing and two stoppers can be provided on the hub toward the extending direction of the wing shaft. In such a case, two stoppers should be provided such that the wing shaft is placed apart from them by an equal distance. Further, in order to maintain the optimum wing angle in the relatively torsional rotation of the wings, it is preferable that an included angle between the pair of stoppers and the wing shaft is in the range of 60° to 120°, that is, an included angle between one stopper and the wing shaft is in the range of 30° to 60° when the wing shaft is viewed in its axial direction.

Further, in the above-described wing-flapping flying apparatus, it is shown in the drawings that the first protrusions, the second protrusions and the stoppers have plate-like shapes. However, the shapes of the protrusions and the stoppers are not limited to the plate-like shape. When considering the rotation of the wings around the rotating shaft, they can be configured as short pins so as not to offset the lift generated by the wings.

In the above-described wing-flapping flying apparatus, the lift and propulsion can be adjusted by the increase and decrease of number of revolution of the rotary machine, the positional adjustment of the pin member or the positional adjustment of the driving pin. Accordingly, in case such operations for increasing and decreasing the lift and propulsion can be electrically controlled, the wing-flapping flying apparatus according to the present invention can freely ascend or descend during flying in the air.

Further, the wing-flapping flying apparatus 100 to 400 can perform forward and backward and right and left flights by slightly biasing the rotating shaft of the rotary machine from the axis of the body like a rotor blade control of a helicopter. Further, in case of connecting two wing-flapping flying apparatus in series, a flying apparatus can be obtained, which is capable of forward and backward and right and left flights by adjusting lift of each wing-flapping flying apparatus. Further, in case of using two rotary machines and letting them rotate the respective wing shafts, forward and backward and right and left flights can be effectuated.

According to a method of driving wings in a wing-flapping flying apparatus according to another aspect of the present invention, in case of citing an example of the wing-flapping flying apparatus 100 in accordance with the first embodiment of the present invention, there is provided a method of driving wings in a wing-flapping flying apparatus, which includes: the body 110; the rotating shaft 115 rotatably joined to the body 110; driving means 111 for rotating the rotating shaft 115; and wings 141a and 141b reciprocated between two points and connected to the rotating shaft 115 so as to be relatively torsionally rotated with respect to the rotating shaft 115 while being rotated together with the rotating shaft 115. The method of driving the wings comprises the following: maintaining the wing 141a, 141b inclined at a constant angle relative to the travel direction of the wing 141a, 141b while the wing travels toward one of the two points; relatively torsionally rotating the wing 141a, 141b in the opposite direction to the travel direction of the wing 141a, 141b when the wing 141a, 141b reaches one of the two points; and moving the wing 141a, 141b toward the other of the two points. (See, FIGS. 6 to 9)

Accordingly, during the rotations of the wings 141a and 141b around the rotating shaft 115, the wings 141a and 141b maintain the optimum wing angle, that is, 30° to 60° by the cooperation of the stoppers 131a and 131b and the first protrusions 143a, 143b, 144a and 144b. Further, during the reversion of the rotational direction of the rotating shaft 115, each wing 141a and 141b is relatively torsionally rotated with respect to the rotating shaft 115 in the opposite direction to the travel direction of each wing 141a and 141b by the cooperation of the pins 133a and 133b, which are formed as one part of the body, and the second protrusions 142a and 142b, which are provided on each wing 141a and 141b (more specifically, each wing shaft 140a and 140b).

Through the above-discussed processes, successive and larger lift and propulsion can be obtained by the rotation of the wings 141a and 141b around the rotating shaft 115 and the relatively torsional rotations of the wings 141a and 141b, which occur during the reversion of the rotational direction of the rotating shaft 115.

Figure 19:
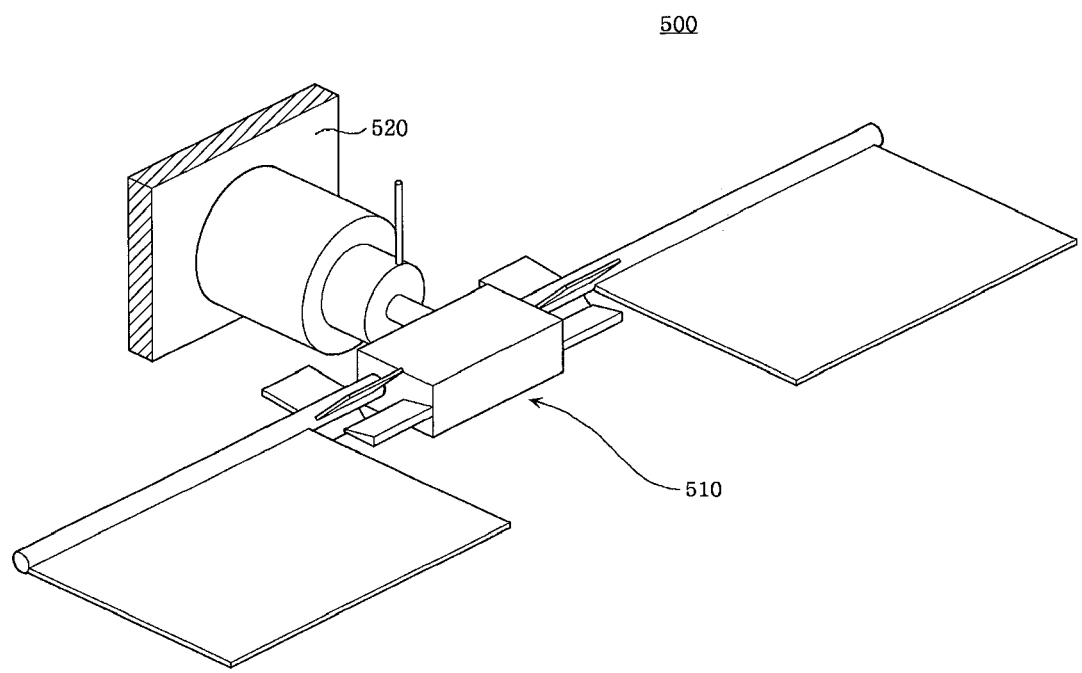
FIG. 19 is a perspective view illustrating a blower according to the present invention.

FIG. 19 is a perspective view illustrating a blower 500 with wing-flapping movements according to yet another aspect of the present invention. As shown in FIG. 19, the blower 500 according to the present invention is configured such that the body part of the above-described wing-flapping flying apparatus 510 is secured to any fixing member 520 to thereby send the air flow made by the wings toward an object necessary to be cooled.

As described above, according to the wing-flapping flying apparatus according to the present invention, the lift is generated during the rotations of the wing shafts and a larger lift is generated while the wings are relatively torsionally rotated during the reversion of the rotational direction of the wing shafts. Thus, if the body part is secured, on the contrary, then successive air-blowing is possible during the rotation of the wing shaft and the reversion of the rotational direction of the wing shaft. As such, the blower 500, which adopts the wing-flapping movements, provides more effective air-blowing than the conventional blower, which blows air by rotating a fan in only one direction. Further, in embodying the blower 500 by utilizing the wing-flapping flying apparatus according to the present invention, the wings, which are coupled to the wing shafts so as to be relatively torsionally rotated, may have various shapes with better air-blowing efficiency.

While the present invention has been particularly shown and described with reference to exemplary embodiments thereof, it will be understood by those of ordinary skill in the art that various changes in form and details may be made therein without departing from the scope of the present invention as defined by the following claims.

INDUSTRIAL APPLICABILITY

As described above, since the wing shaft is rotated around the rotating shaft and the wing is relatively torsionally rotated around the wing shaft, the wing-flapping flying apparatus generates lift needed for its flight throughout an entire wing-flapping movement without generating lift only throughout the half of a wing-flapping movement or offsetting the generated lift by the other half of a wing-flapping movement like a conventional upward-and-downward reciprocating wings. Therefore, a stable flight of the flying apparatus is obtained.

Further, since the lift generation of the flying apparatus can be controlled by means of the increase and decrease of the number of revolution of the rotary machine, the adjustment of the pin member, the adjustment of the driving pin and so forth, the wing-flapping flying apparatus capable of ascending or descending in the air is provided.

In addition, the use of the wing-flapping flying apparatus or the wing-flapping method adopted thereto can provide a propulsion mechanism, which can be used in a flying apparatus as tiny as a hummingbird or an insect. Further, the application of such wing-flapping flying apparatus or the wing-flapping method thereof to a blower can provide a more efficient microminiature blower or cooling fan than a conventional blower, which operates in a simple manner.

The invention claimed is:

1. A wing-flapping flying apparatus, comprising:
    a body;
    a rotating shaft rotatably joined to the body;
    driving means for rotating the rotating shaft and periodically reversing a rotational direction of the rotating shaft;
    a plurality of wing parts connected to the rotating shaft so as to be rotated together with the rotating shaft and to be relatively torsionally rotated with respect to the rotating shaft;
    means for restricting a relatively torsional rotation range of the wing part with respect to the rotating shaft; and
    means for relatively torsionally rotating the wing part during reversion of a rotational
    direction of the rotating shaft, wherein the means for relatively torsionally rotating the wing part comprises a pin member fixed to the body so as to correspond to a reversion location of the rotational direction of the rotating shaft; and
    a first protrusion formed on the wing part so as to contact the pin member during reversion of the rotational direction of the rotating shaft.

2. The wing-flapping flying apparatus of claim 1, wherein the means for restricting relatively torsional rotation range comprises:
    a stopper fixed with respect to the rotating shaft; and
    a second protrusion formed on the wing part so as to contact the stopper by a relatively torsional rotation of the wing part;
    wherein the contact of the stopper and the first protrusion is effected at two points.

3. The wing-flapping flying apparatus of claim 2, wherein an included angle between the two points and a center of the relatively torsional rotation of the wing part is in a range of 60° to 120°.

4. The wing-flapping flying apparatus of claim 1, wherein the pin member comprises a plurality of pins placed apart from each other at a predetermined angle around the rotating shaft, and wherein the wing part is reciprocated around the rotating shaft between two mutually adjacent pins.

5. A blower with wing-flapping movements, comprising:
    a wing-flapping flying apparatus according to claim 1; and
    a fixing member to which the body of the wing-flapping flying apparatus is secured.

* * * * *